United States Patent [19]
Skonecki

[11] Patent Number: 5,305,550
[45] Date of Patent: Apr. 26, 1994

[54] PERSONALIZED FLOWER

[76] Inventor: Debra Skonecki, 5852 Comet Ave., Toldedo, Ohio 43623

[21] Appl. No.: 84,765

[22] Filed: Jun. 28, 1993

Related U.S. Application Data

[63] Continuation of Ser. No. 652,590, Feb. 8, 1991, abandoned.

[51] Int. Cl.⁵ ............................................. A01B 79/00
[52] U.S. Cl. ................... 47/58 MS; 47/1.01; 428/24
[58] Field of Search .................. 47/58.01, 1.01; 428/24–26, 22

[56] References Cited

U.S. PATENT DOCUMENTS

| | | | |
|---|---|---|---|
| D. 219,786 | 1/1971 | Prybella | 428/24 |
| 854,224 | 5/1907 | Lamprey | 428/22 |
| 1,484,656 | 2/1924 | Koropp | 47/DIG. 11 |
| 4,490,940 | 1/1985 | Geiges | 428/24 |
| 4,664,956 | 5/1987 | Dokkestul | 428/22 |
| 4,949,486 | 8/1990 | Belokin | 428/24 |
| 4,979,378 | 12/1990 | Cardin | 428/10 |
| 4,983,890 | 1/1991 | Satoh | 428/24 |

FOREIGN PATENT DOCUMENTS

| | | | |
|---|---|---|---|
| 1508366 | 1/1968 | France | 428/24 |
| 8382 | 9/1989 | PCT Int'l Appl. | 47/DIG. 12 |
| 2204472 | 11/1988 | United Kingdom | 47/DIG. 11 |

Primary Examiner—Henry E. Raduazo
Attorney, Agent, or Firm—MacMillan, Sobanski & Todd

[57] ABSTRACT

A fresh natural flower, such as a rose, is provided with a personalized message or drawing inscribed on one of its petals. The message or drawing is applied by an applicator, such as a pen containing an opaque pigmented oil-based paint. The paint preferably includes a gold or silver metallic pigment and xylene.

10 Claims, 1 Drawing Sheet

PERSONALIZED FLOWER

This is a continuation of copending application(s) Ser. No. 07/652,590 filed on Feb. 8, 1991, now abandoned.

BACKGROUND OF THE INVENTION

This invention relates in general to decorative articles and in particular to a fresh natural flower having a personalized message or drawing inscribed on one of its petals.

Fresh flowers are given by people to celebrate a special occasion, such as an anniversary, Valentine's day, or the birth of a child. The flowers can be given by themselves or as part of an arrangement incorporating other articles representative of the occasion. In either situation, the person giving the flowers is trying to impart a special message to the person receiving the flowers. Thus, it would be desirable to have a convenient way of including a particular message with the flowers which is simple and inexpensive.

SUMMARY OF THE INVENTION

This invention relates to a fresh natural flower having a personalized message or drawing inscribed on one of its petals. A flower, such as a rose, is provided having a plurality of petals. A suitable applicator, such as a pen containing an opaque oil-based pigmented paint or ink is used to inscribe a personalized message and/or drawing on one or more of the petals of the rose. Preferably, the opaque pigment is metallic, such as gold or silver, and the oil base contains xylene. Thus, a unique individualized message or drawing can be easily applied to the petal to mark a special occasion. Further, the inscription remains permanent on the petal allowing the personalized petal to be preserved without any special process in order to provide a lasting reminder of the occasion.

DETAILED DESCRIPTION OF THE PREFERRED EMBODIMENT

Figure 1:
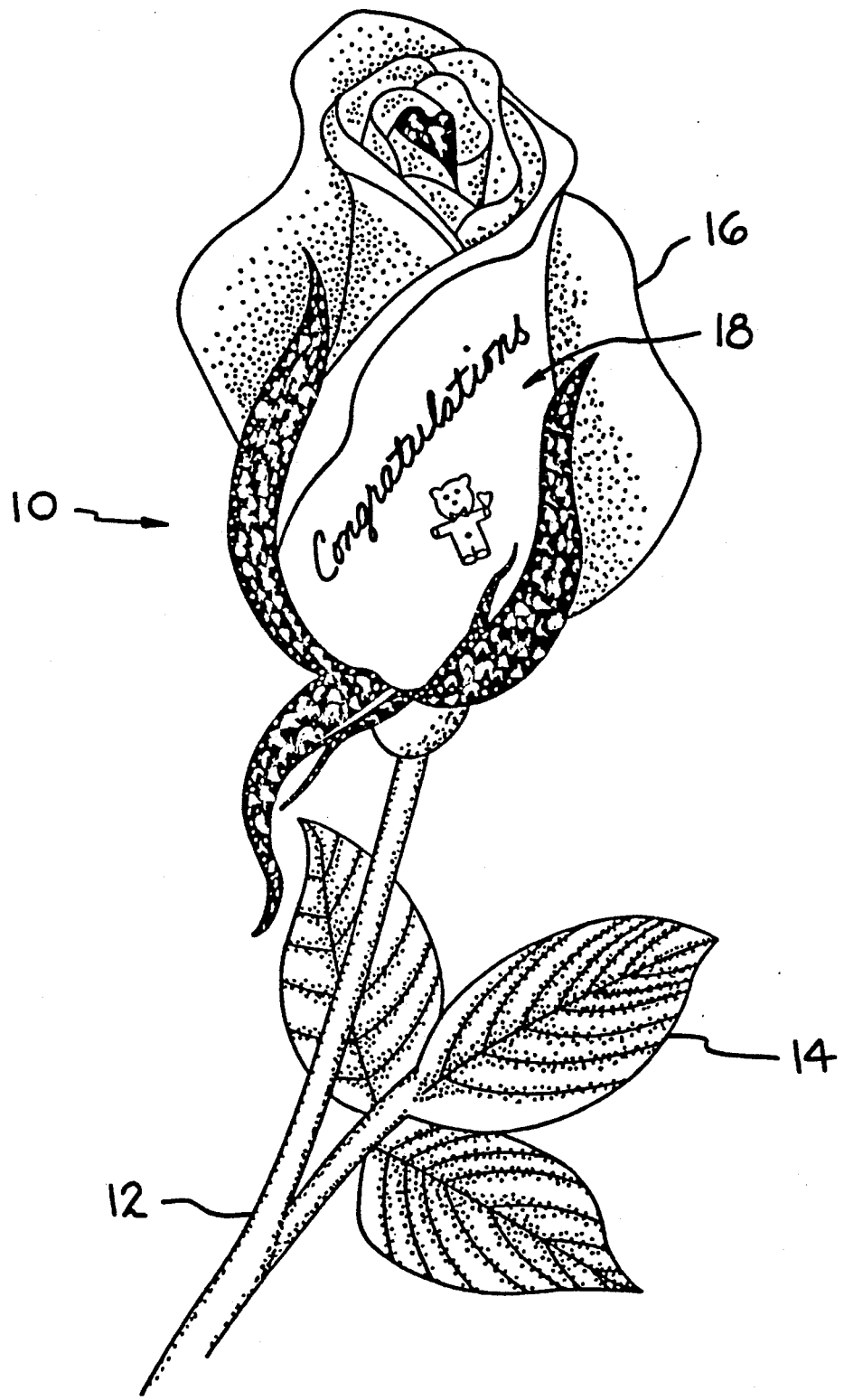
FIG. 1 is a perspective view of a flower having a personalized message inscribed on a petal thereof, in accordance with this invention.

Referring now to the drawing, FIG. 1 shows a flower, indicated generally at 10, having a personalized message inscribed thereon in accordance with this invention. The flower 10 is illustrated as a rose, but it is understood that any fresh natural flower can be used. The rose 10 includes a stem 12, a plurality of leaves 14, and a plurality of petals 16. One of the petals 16 includes a personalized message or drawing, indicated generally at 18, written on an outer surface thereof. The message or drawing 18 is applied directly onto the surface of the petal 16 without any preparation of the petal surface. It may also be desirable to apply the message or drawing 18 to one of the leaves 14.

The substance applied to the petal surface is an opaque pigmented oil-based paint or ink. Such a paint or ink can be easily applied directly onto the petal surface by using an applicator such as a pen or brush containing the above substance. While many different colors of opaque paint can be used, it has been found that the most dramatic effect is achieved by using a metallic pigmented paint, such as gold or silver. Also, it has been preferable to use an oil-based paint containing xylene.

One type of applicator which has been found to provide satisfactory results is a pen manufactured by Pilot Corporation of America of Trumbull, Connecticut. The Pilot pen is available in a 4.5 mm medium point tip and a 1.0 mm extra-fine point tip, in either a gold pigmented paint or a silver pigmented paint, both of which contain the solvent xylene. Similar pens which produce satisfactory results are also available from the Sanford Corporation of Bellwood, Ill., under the trademarks GOLD COAT and CALLIGRAPHIC PEN, and the Fiber-Castell Corporation of Lewisburg, Tenn., under the trademark UNIPAINT MARKER PX-21. However, the Pilot pen is preferred since its 1.0 mm extra-fine point tip is the finest tip available from the group. All the pens in the group are operable to enable the paint to flow from a tip thereof onto the petal by applying minimal pressure to the petal with the tip, thereby preventing damage to the pedal.

When the Pilot pen is used to write on the surface of the petal, a fine line of paint is applied which dries almost instantly upon contact with the surface of the petal. As a result, no smearing, smudging or other unwanted marks are left on the petal surface. Further, the paint remains in its written message after the rose has withered and the petals have dried out. This allows the dried petal having the personalized message to be kept and preserved as a remembrance of the occasion for which it was given.

In accordance with the provisions of the patent statutes, the principle and mode of operation of the invention have been described and illustrated in its preferred embodiment. However, it must be understood that the invention may be practiced otherwise than as specifically explained and illustrated without departing from its scope or spirit.

I claim:

1. A method for producing a decorative article comprising the steps of:
   providing a fresh natural flower having a plurality of petals; and
   applying an individually personalized message or drawing to at least one of said petals by using a hand-held applicator which contains a permanent paint, said hand-held applicator operable to enable said paint flow from a tip thereof onto said one petal by applying minimal pressure to said one petal with said tip, thereby preventing damage to said one petal.

2. The method defined in claim 1 wherein said paint is an opaque pigmented oil-based paint.

3. The method defined in claim 1 wherein said paint includes a metallic pigment.

4. The method defined in claim 1 wherein said paint includes xylene.

5. The method defined in claim 1 wherein said flower is a rose.

6. A decorative article having an individually personalized message or drawing applied in accordance with the process of claim 11.

7. The decorative article defined in claim 6 wherein said paint is an opaque pigmented oil-based paint.

8. The decorative article defined in claim 6 wherein said paint includes a metallic pigment.

9. The decorative article defined in claim 6 wherein said paint includes xylene.

10. The decorative article defined in claim 6 wherein said flower is a rose.

* * * * *